United States Patent

Craft, Jr.

[15] 3,650,061

[45] Mar. 21, 1972

[54] TRAP FOR GOPHERS AND THE LIKE

[72] Inventor: Loie C. Craft, Jr., 2430 Amelia Street, Shreveport, La. 71108

[22] Filed: July 16, 1970

[21] Appl. No.: 55,402

[52] U.S. Cl. ..............................................43/77, 43/42.7
[51] Int. Cl. .................................................A01m 23/00
[58] Field of Search ....................43/42.7, 44.82, 43.1, 77

[56] References Cited

UNITED STATES PATENTS

| 356,661 | 1/1887 | Pfaff | 43/44.82 X |
| 372,677 | 11/1887 | Hubbard | 43/42.7 X |
| 1,054,344 | 2/1913 | Fikes | 43/77 |
| 2,184,073 | 12/1939 | Fuiks | 43/42.7 |

*Primary Examiner*—Joseph S. Reich

[57] ABSTRACT

This is a trap for eradicating gophers in the form of a chain having a pair of spaced treble fish hooks secured longitudinally to the aforesaid chain in a manner that will prevent the hooks from rotating. The lower end of the chain is provided with a lead fish sinker while the upper end of the same chain is formed into a loop by which the eradicator is secured when placed in position for use in a gopher hole in the ground.

6 Claims, 3 Drawing Figures

PATENTED MAR 21 1972 3,650,061

INVENTOR
LOIE C. CRAFT, JR.

TRAP FOR GOPHERS AND THE LIKE

This invention relates to gophers, which are burrowing rodents about the size of a large rat; the device particularly relates to a trap for catching gophers and the like; still more particularly to a trap that is in the form of a plurality of treble fish hooks adapted to be placed in the gopher hole for catching the gophers, as will hereinafter be explained.

It is the principal object of this invention to provide a trap for gophers and the like that will automatically catch any living creature that burrows into the ground.

Another object of this invention is to provide a trap for gophers and the like, the trap being so constructed as not to require any moving parts or mechanism.

Still another object of this invention is to provide a trap for gophers and the like that is fully automatic in its operation.

Other and further objects and advantages of this invention will appear as the reading of this specification and its appended claims proceeds and the accompanying drawing is examined in connection with the reading of the specification and claims.

In the drawing:

FIG. 3 is a sectional view of the upper portion of part of a gopher hole in the ground in which this trap has been placed for the catching of a gopher or the like.

In the several views of this invention like parts are indicated by like reference numbers.

The reference number 5 indicates this invention in its entirety.

Figure 1:
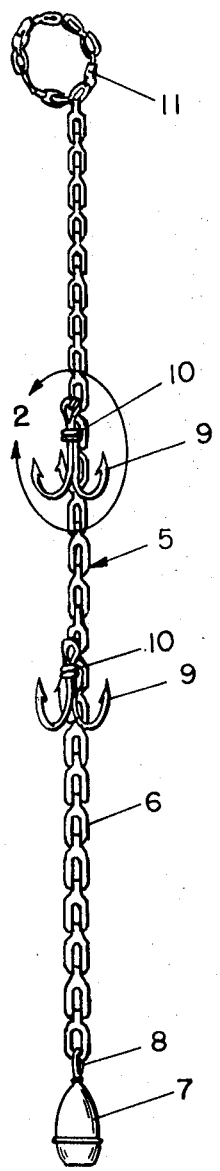
FIG. 1 is a side view of this invention.
Figure 2:
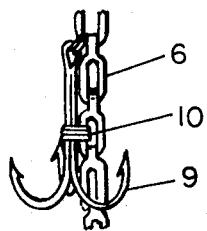
FIG. 2 is an enlarged side view of that portion of this invention enclosed within the arrowed ellipse and indicated by the number 2 in FIG. 1.
Figure 3:
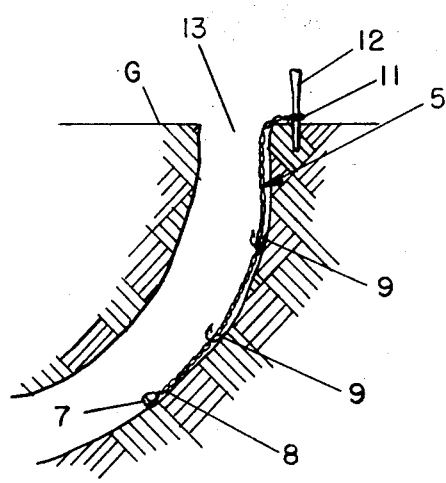

Looking first at FIG. 1 of the accompanying drawing, it will be seen that this invention 5 consists of a metal chain 6, to the lower end of which is suitably secured the lead fishing sinker 7, to the lower end 8 of the aforesaid chain 6. A pair of spaced treble fishing hooks 9 are secured to the aforesaid chain 6 by means of a rubber band 10, as one can best see on examination of FIG. 2 of the drawing. The purpose of this rubber band or its equivalent is to prevent the fish hook from rotating around the chain 6. The upper end of the above mentioned chain 6 is formed into a loop 11 that is placed over a stake 12 which is driven into the ground G near the gopher hole 13 that is clearly shown in FIG. 3 of the accompanying drawing. Here it is seen that the aforesaid chain 6 and its accompanying parts are placed in the gopher hole after a gopher has left the hole for food or for any other reason. When the gopher, which is not shown in any of the views of the accompanying drawing, reenters the hole 13, the gopher will become snared on the fish hooks 9. The gopher or the like will then be unable to get back down into its hole in the ground and it can then be easily pulled out by the removal of the aforesaid chain 6 from the gopher hole.

It is to be realized that this invention can not only be used for catching gophers but it can be used for trapping any other creature that makes it home in the ground, such as certain species of large spiders, crawfish, moles, and the like. To those experienced in the art it will be realized that gophers are sciuromorphic rodents of the family *Geomyidae*.

This novel trap is subject to any and all changes in detail design as well as any modifications one may care to make in the same in so long as the changes and/or modifications fall within the scope and intent of the appended claims. The invention may be made of any desired material and of any size depending on the size of the mammal or the like that one is interested in trapping.

What I now claim as new and desire to secure by Letters Patent is:

1. A trap for gophers and the like, comprising a chain having structure on the lower end thereof to hold the said chain in a predetermined position; and a plurality of pointed devices secured to the said chain above the said structure, the said devices being so constructed as to snag and hold any gopher coming into contact with the points of the said devices; and means of securing the upper end of the said chain to the ground when the said trap has been placed in a gopher hole in the ground after a gopher has come out of the hole.

2. The invention of claim 1, wherein the said structure is a lead fishing sinker.

3. The invention of claim 2, wherein the said pointed devices are treble fishing hooks.

4. The invention of claim 3, wherein the said treble fishing hooks are secured longitudinally on the said chain and each treble fishing hook is prevented from rotating about its longitudinal axis by means of a rubber band that encompasses both the said treble fishing hook and the said chain.

5. The invention of claim 4, wherein the said means of securing the upper end of the said chain to the ground includes a stake having its lower end positioned in the ground near the gopher hole, and said chain having its upper end forming a loop positioned around said stake and resting on the ground.

6. The invention of claim 5, wherein there are two of the said treble fishing hooks that are secured in longitudinal spaced relation to the said chain.

* * * * *